US012655570B2

(12) United States Patent
Attar et al.

(10) Patent No.: US 12,655,570 B2
(45) Date of Patent: Jun. 16, 2026

(54) MULTIFUNCTION LIFTER FOR A LAUNDRY APPLIANCE

(71) Applicant: WHIRLPOOL CORPORATION, Benton Harbor, MI (US)

(72) Inventors: Mohsin Mahamadshafi Attar, Jaysingpur (IN); Sandip Kashinath Kardile, Pune (IN); Wesley Paul Traylor, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 645 days.

(21) Appl. No.: 18/106,030

(22) Filed: Feb. 6, 2023

(65) Prior Publication Data

US 2024/0263379 A1 Aug. 8, 2024

(51) Int. Cl.

*D06F 58/04* (2006.01)
*B08B 7/00* (2006.01)
*D06F 58/20* (2006.01)
*D06F 58/22* (2006.01)

(52) U.S. Cl.

CPC ............ *D06F 58/04* (2013.01); *B08B 7/0028* (2013.01); *D06F 58/203* (2013.01); *D06F 58/22* (2013.01)

(58) Field of Classification Search

CPC ........ D06F 58/04; D06F 58/203; D06F 58/22; B08B 7/0028

See application file for complete search history.

(56) References Cited

U.S. PATENT DOCUMENTS 2,835,048 A * 5/1958 Olthuis .................. D06F 58/04 34/132
2,851,791 A 9/1958 Olthuis
3,701,202 A * 10/1972 Compa ................ D06M 23/02 34/597
3,870,145 A * 3/1975 Mizuno ................ D06F 58/203 510/516
4,236,320 A 12/1980 Schwadike et al.
4,920,662 A 5/1990 Seeburger
6,899,281 B1 * 5/2005 Griese .................. D06F 58/203 34/597
7,874,501 B2 * 1/2011 Griese .................... A47L 15/44 239/57
9,915,022 B2 * 3/2018 Cozzolino .............. D06F 58/30

(Continued)

FOREIGN PATENT DOCUMENTS

CN 103306112 B 12/2016
EP 1690974 B1 4/2008

(Continued)

*Primary Examiner* — David J Laux
(74) *Attorney, Agent, or Firm* — Price Heneveld LLP

(57) ABSTRACT

A laundry appliance includes a drum that is disposed within a cabinet. The drum defines a processing space and rotationally operates during a drying operation. The drum cooperates with an airflow path to dehumidify articles being processed within the processing space. A lifter is attached to an inner surface of the drum. The lifter defines an attachment receptacle and rearranges the articles within the processing space during performance of the drying operation. A particulate removal accessory is selectively removable from the attachment receptacle and operates to separate particulate from the articles being processed.

20 Claims, 12 Drawing Sheets

(56) References Cited

U.S. PATENT DOCUMENTS

| | | | | |
|---|---|---|---|---|
| 2006/0179896 | A1* | 8/2006 | Lim | D06F 25/00 68/20 |
| 2009/0193677 | A1* | 8/2009 | Claudius | D06F 58/04 34/108 |
| 2009/0308109 | A1* | 12/2009 | Geyer | D06F 37/06 68/4 |
| 2014/0215847 | A1* | 8/2014 | Haselmeier | D06F 58/04 34/130 |
| 2017/0055807 | A1 | 3/2017 | Rucki | |
| 2019/0062985 | A1* | 2/2019 | Christensen | D06F 58/04 |
| 2022/0220657 | A1* | 7/2022 | Bauer | D06F 58/10 |

FOREIGN PATENT DOCUMENTS

| | | | |
|---|---|---|---|
| WO | 2013131997 | A1 | 9/2013 |
| WO | 2020216051 | A1 | 10/2020 |

* cited by examiner

MULTIFUNCTION LIFTER FOR A LAUNDRY APPLIANCE

BACKGROUND OF THE DISCLOSURE

The present disclosure generally relates to laundry appliances, and more specifically, to a laundry appliance that includes a lifter or a baffle that includes a multifunction interface. The multifunction interface provides for removal and replacement of a number of lifter accessories that can be used for separating particulate from articles being processed within a laundry appliance.

SUMMARY OF THE DISCLOSURE

According to one aspect of the present disclosure, a laundry appliance includes a drum that is disposed within a cabinet. The drum defines a processing space and rotationally operates during a drying operation. The drum cooperates with an airflow path to dehumidify articles being processed within the processing space. A lifter is attached to an inner surface of the drum. The lifter defines an attachment receptacle and rearranges the articles within the processing space during performance of the drying operation. A particulate removal accessory is selectively removable from the attachment receptacle and operates to separate particulate from the articles being processed.

According to another aspect of the present disclosure, a particulate removal system for a laundry appliance includes a rotating drum that has an outer wall that defines a processing space. The drum cooperates with an airflow path that delivers process air through the processing space to dehumidify articles within the processing space. A lifter extends from the outer wall and into the processing space. The lifter defines an attachment receptacle and rearranges the articles within the processing space during performance of a drying operation. A particulate removal accessory is selectively removable from the attachment receptacle and operates to separate particulate from the articles being processed. The particulate removal accessory includes at least one of a particulate collecting roller, a fluid dispenser, and a consumable fabric softener.

According to yet another aspect of the present disclosure, a particulate removal system for a laundry appliance includes a lifter that is configured for attachment to an inner surface of a rotating drum. The lifter defines an attachment receptacle that is disposed within a processing space. The lifter is further configured to rearrange articles within the processing space during performance of a drying operation. A particulate removal accessory is selectively removable from the attachment receptacle. The particulate removal accessory operates to separate particulate from the articles being processed. The particulate removal accessory includes a particulate collecting roller, a fluid dispenser, and a consumable fabric softener that are selectively and alternatively attached to the attachment receptacle. The attachment receptacle includes a first end and a second end, and at least one of the first end and the second end includes an outwardly biased receiver that selectively engages the particulate removal accessory in an installed position.

These and other features, advantages, and objects of the present disclosure will be further understood and appreciated by those skilled in the art by reference to the following specification, claims, and appended drawings.

Figure 1:
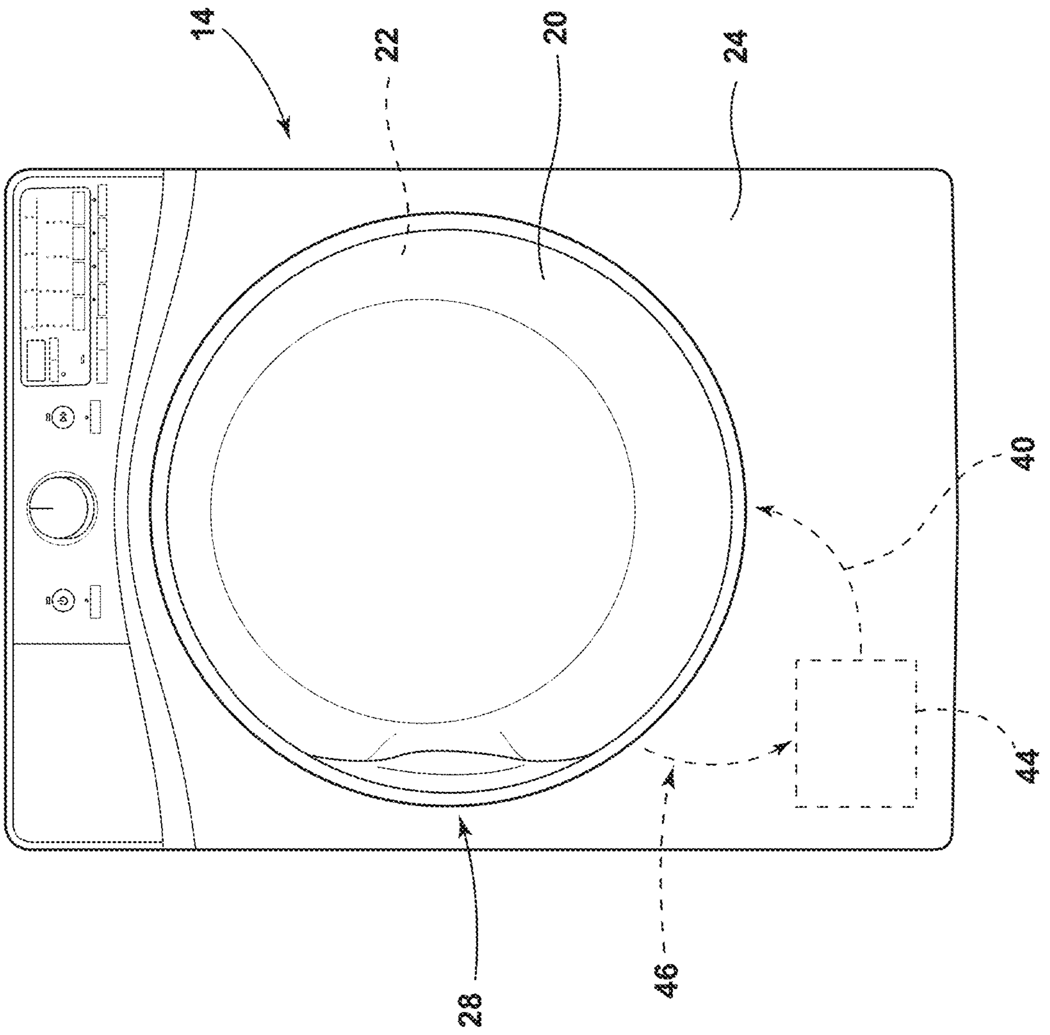
FIG. 1 is a front elevational view of a laundry appliance that includes an aspect of the lifter that includes the attachment receptacle.
Figure 2:
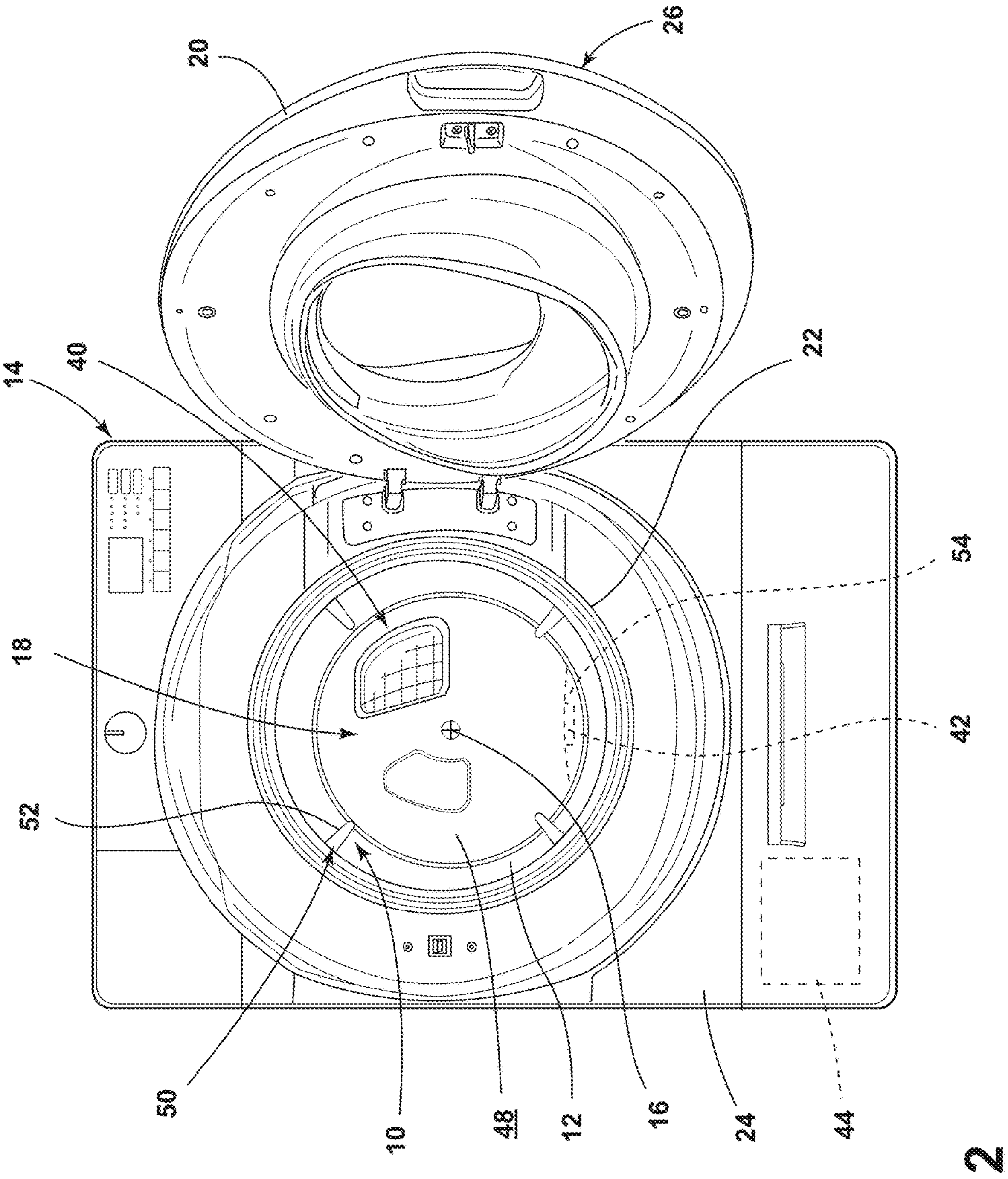
FIG. 2 is a front elevational view of the appliance of FIG. 1 with the door in an open position.

The components in the figures are not necessarily to scale, emphasis instead being placed upon illustrating the principles described herein.

DETAILED DESCRIPTION

The present illustrated embodiments reside primarily in combinations of method steps and apparatus components related to a laundry appliance that includes a lifter having an attachment receptacle that can receive any one of a plurality of particulate removal accessories that can be attached to the lifter for providing certain functionality related to the removal of particulate matter from articles being processed within the laundry appliance. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms “including,” “comprises,” “comprising,” or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by “comprises a . . . ” does not, without more constraints, preclude the existence of additional identical elements in the process, method, article, or apparatus that comprises the element.

Referring now to FIGS. 1-5, reference numeral 10 generally designates a lifter that is incorporated within a rotating drum 12 for a laundry appliance 14. The rotating drum 12 operates about a rotational axis 16, typically a horizontal rotational axis 16 or an angled rotational axis 16 of the appliance 14. The drum 12 for the appliance 14 defines a processing space 18 that can be accessed through a door 20 that provides selective access to an access opening 22 that extends through an outer cabinet 24. When the door 20 is in an open position 26, the access opening 22 is available to allow a user to access the processing space 18 within the cabinet 24. The door 20 in a closed position 28 seals the processing space 18 during operation of a particular laundry operation.

According to the various aspects of the device, as exemplified in FIGS. 1-5, the laundry appliance 14 includes the drum 12 that is disposed within the cabinet 24. The drum 12 defines the processing space 18 and rotationally operates during the drying operation. The drum 12 cooperates with an airflow path 40 to dehumidify articles 42 being processed within the processing space 18. A blower 44 delivers process air 46 through the airflow path 40, which includes the processing space 18 of the drum 12. A lifter 10 is attached to an inner surface 48 of the drum 12. The lifter 10 defines an attachment receptacle 50. The lifter 10 operates during rotation of the drum 12 to rearrange the articles 42 being processed within the processing space 18 during performance of the drying operation. A particulate removal accessory 52 is selectively removable from, and selectively attached to, the attachment receptacle 50 of the lifter 10. The particulate removal accessory 52 operates to separate foreign particles 54, such as lint, pet hair, and other particulate, from articles 42 being processed within the drum 12.

Figure 3:
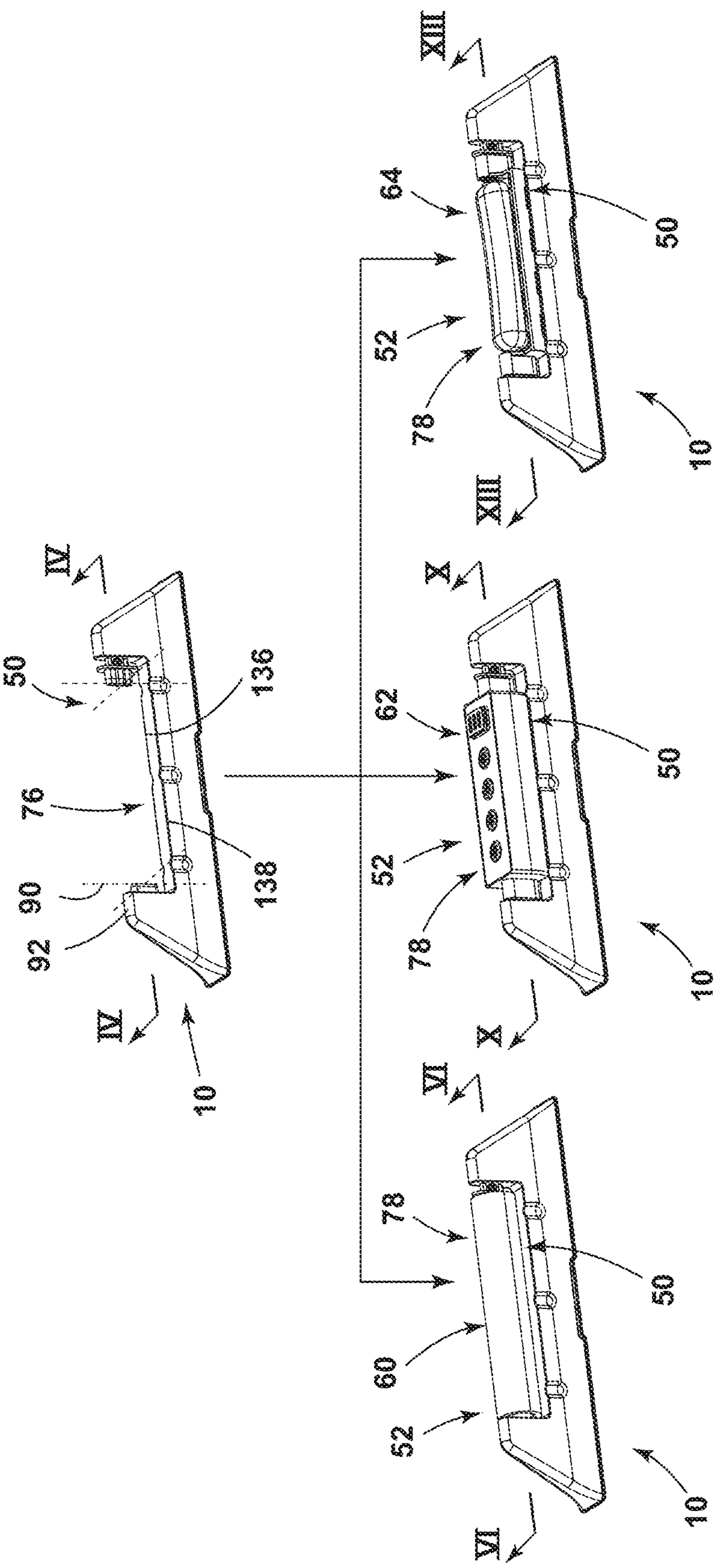
FIG. 3 is a perspective view of the lifter showing the attachment receptacle with each of the accessories removed and also showing the lifter with a plurality of accessories attached in a series of alternative configurations.
Figure 4:
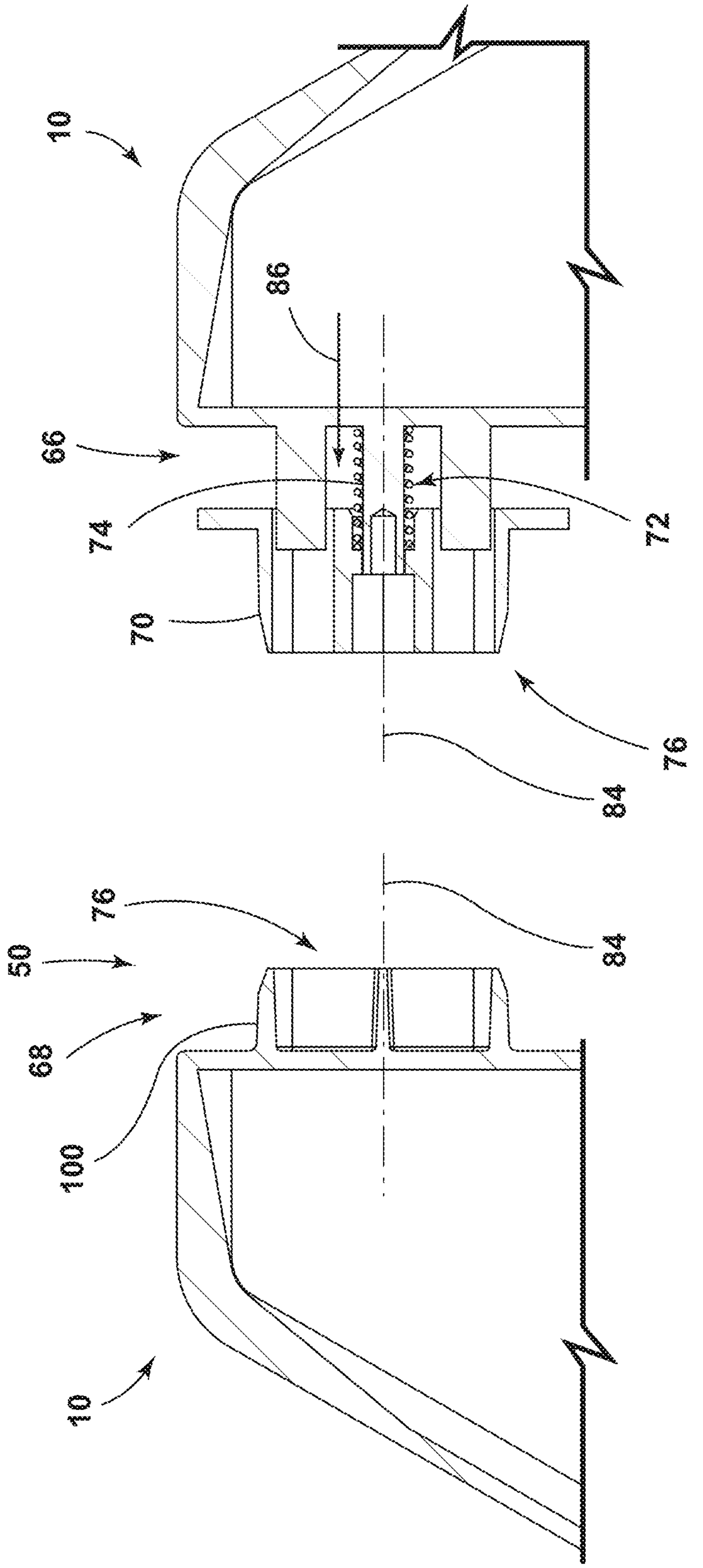
FIG. 4 is a cross-sectional view of the lifter of FIG. 3 taken along the line IV-IV.
Figure 5:
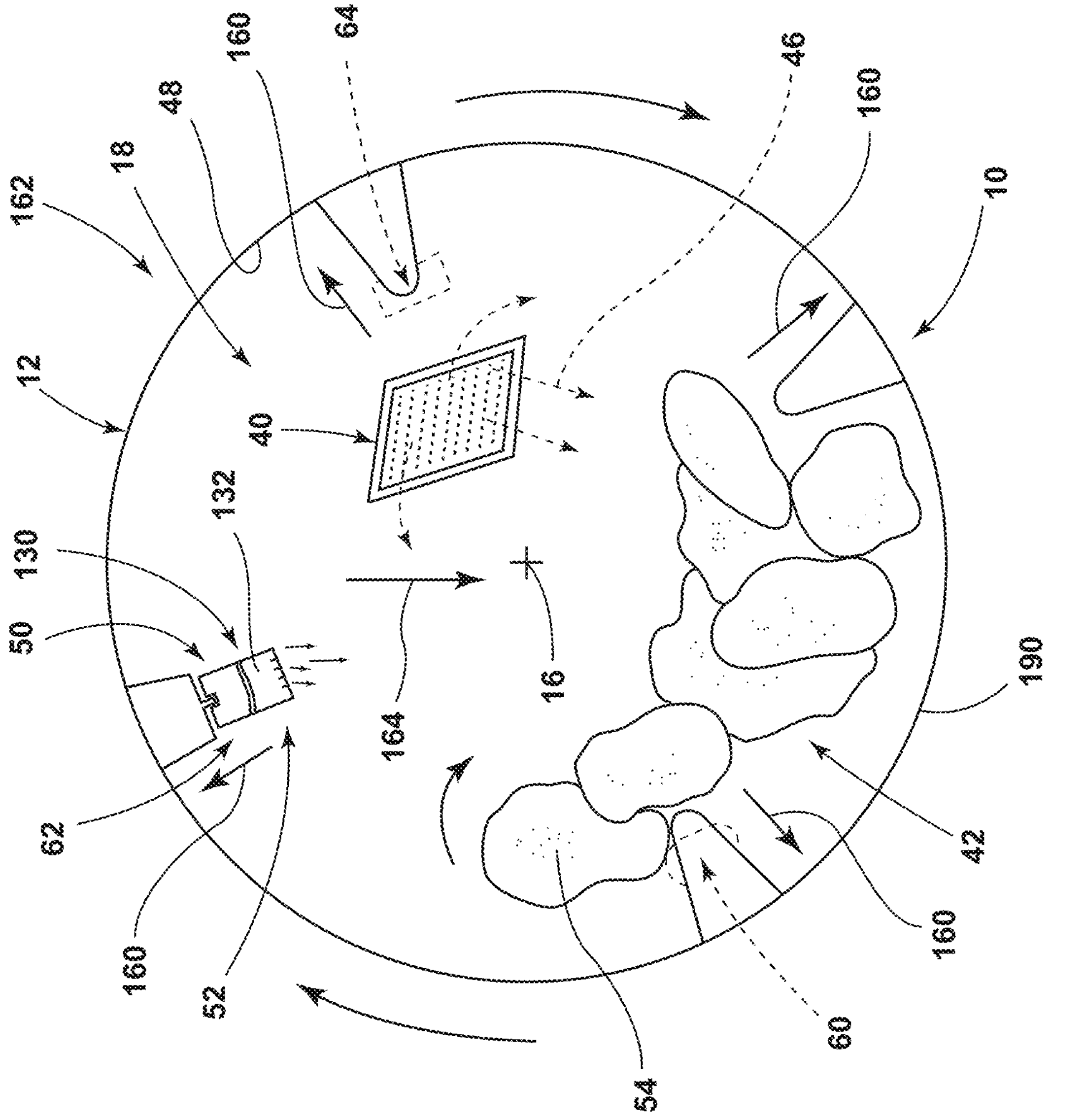
FIG. 5 is a schematic cross-sectional view of an aspect of the rotating drum shown operating with the fluid dispenser installed within one of the lifters.

Referring now to FIG. 3, the particulate removal accessory 52 can include any number of accessories that are adapted for attachment to the attachment receptacle 50 of the lifter 10. By way of example, and not limitation, the particulate removal accessory 52 can include a particulate collecting roller 60, a fluid dispenser 62, a consumable fabric softener 64, various brushes, electrostatic mitigation devices, combinations thereof, and other similar accessories. For attaching the various particulate removal accessories to the lifter 10, the attachment receptacle 50 includes a first end 66 and a second end 68. At least one of the first end 66 and the second end 68 includes an outwardly biased receiver 70 that selectively engages the particulate removal accessory 52 in an installed position 78.

Referring now to FIGS. 3-6, in certain aspects of the device, the first end 66 can include the outwardly biased receiver 70. This outwardly biased receiver 70 includes a biasing element 72, typically in the form of a spring 74, that biases the receiver 70 outward and away from the first end 66 and toward the second end 68 and an accessory space 76 where the particulate removal accessory 52 is located in an installed position 78. When the desired particulate removal accessory 52 is moved into the installed position 78 and coupled to the attachment receptacle 50, a first side 80 of the accessory 52 engages the first end 66 and biases the receiver 70 toward the first end 66. The second side 82 of the accessory 52 is then placed adjacent to the second end 68 of the attachment receptacle 50. The biasing force 86 exerted by the biasing mechanism causes the accessory 52 to move along a longitudinal axis 84 that extends between the first and second ends 66, 68 to engage the second side 82 of the accessory 52 with the second end 68 of the attachment receptacle 50. The biasing element 72 and the biasing force 86 applied thereby maintain the accessory 52 in the installed position 78. When the accessory 52 is desired to be detached from the attachment receptacle 50, the accessory 52 is moved toward the first end 66 to compress the biasing element 72 coupled with the receiver 70 toward the first end 66. When the accessory 52 is moved to a particular distance along the longitudinal axis 84 of the receiver 70, the second side 82 of the accessory 52 is cleared relative to the second end 68 of the attachment receptacle 50 so that the accessory 52 can be removed from the attachment receptacle 50.

Referring again to FIGS. 3-6, the first and second ends 66, 68 of the attachment receptacle 50 can have a general alignment and configuration that matches the profile of the lifter 10. In certain aspects, each of the first and second ends 66, 68 can have a shape that includes a primary axis 90 and a secondary axis 92 that is shorter than the primary axis 90. With this configuration, a portion of the accessory 52 is able to engage the attachment receptacle 50 in a generally fixed position relative to the lifter 10. This configuration helps to maintain the accessory 52 in a desired position to achieve a particular functionality with respect to the lifter 10 and the drum 12. It is further contemplated that certain accessories can include a rotating element or can include a generally circular profile that provides for rotation of a portion of the accessory 52 about the longitudinal axis 84 that extends between the first and second ends 66, 68 of the attachment receptacle 50.

Referring again to FIGS. 3-6, it is contemplated that each of the first and second ends 66, 68 include an outwardly biased receiver 70 that can be biased toward the accessory space 76 of the attachment receptacle 50. Through this configuration, the accessory 52 can be installed on either the first or second end 66, 68 and biased away from the attachment space of the attachment receptacle 50. As exemplified in FIGS. 3-6, the first end 66 includes the receiver 70 and the second end 68 includes a fixed bracket 100 that is incorporated within the surface of the attachment receptacle 50 for the lifter 10.

Figure 6:
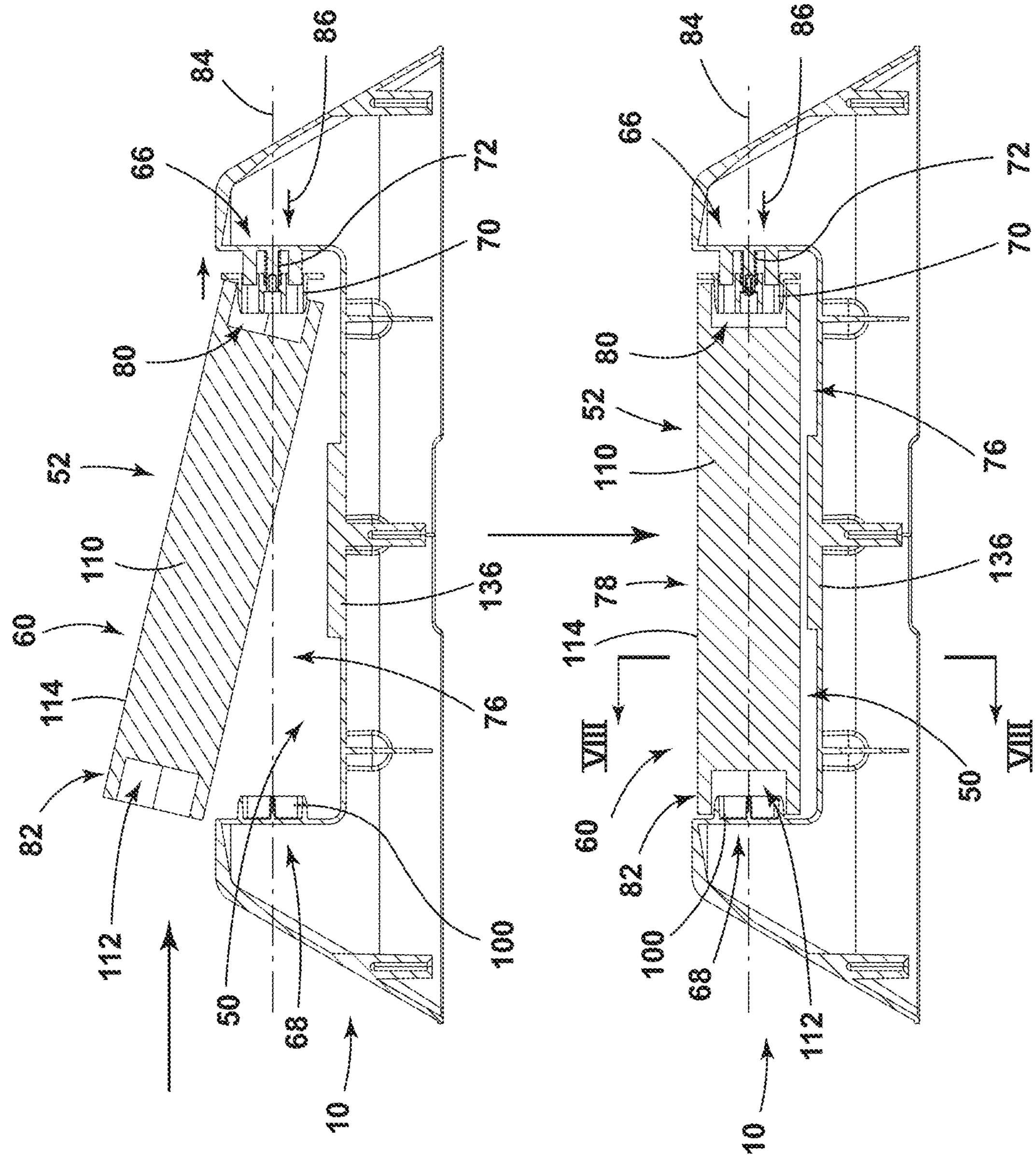
FIG. 6 is a cross-sectional view of the lifter of FIG. 3 taken along the line VI-VI, and showing installation and attachment of a particulate collecting roller within the attachment receptacle of the lifter.
Figure 7:
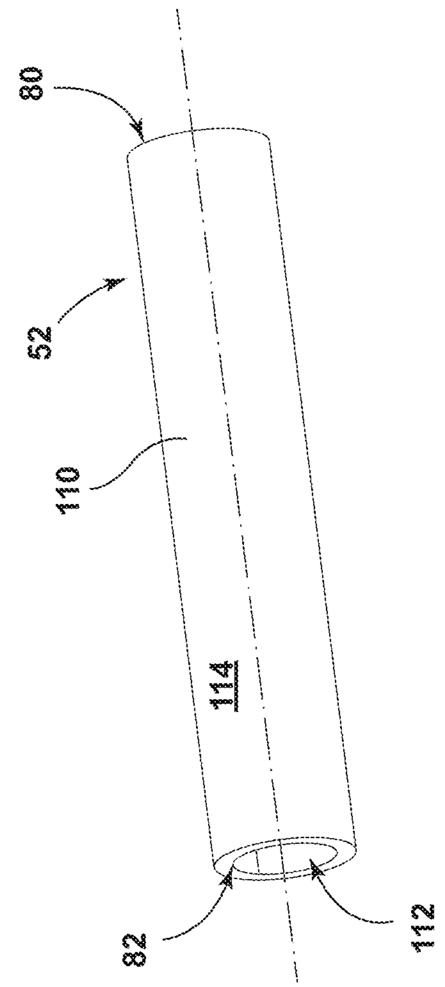
FIG. 7 is a perspective view of an aspect of the particulate collecting roller separated from the attachment receptacle of the lifter.
Figure 8:
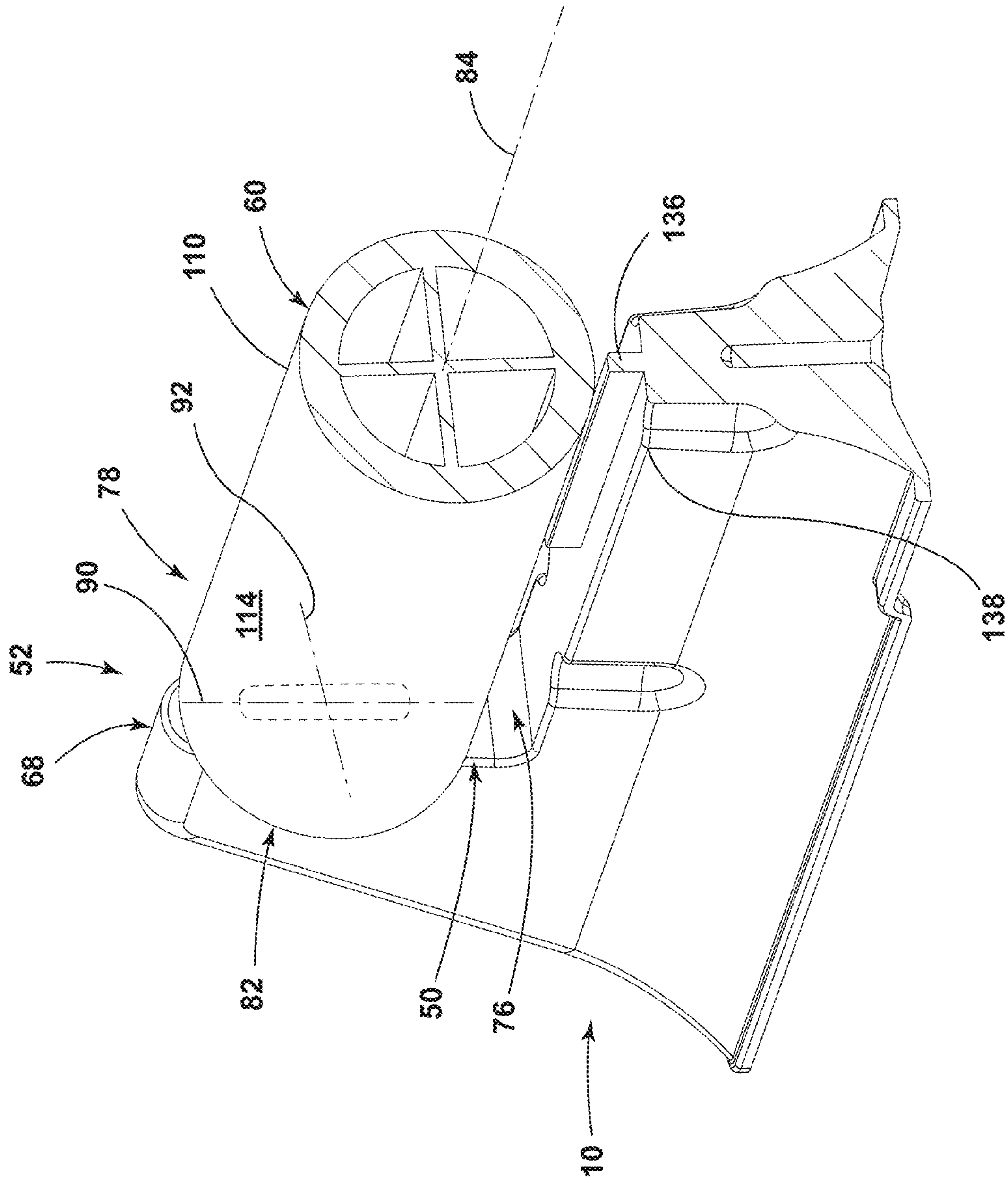
FIG. 8 is a cross-sectional view of the lifter of FIG. 6 taken along the line VIII-VIII.

Referring now to FIGS. 6-8, one of the particulate removal accessories can include the particulate collecting roller 60. The particulate collecting roller 60 can include a roller portion 110 that includes recesses 112 that extend inward at opposing first and second sides 80, 82 of the roller 60. These recesses 112 are configured to engage the first and second ends 66, 68 of the attachment receptacle 50. Through this engagement, the roller portion 110 for the particulate collecting roller 60 is allowed to rotate about the longitudinal axis 84 of the attachment receptacle 50 during a performance of a drying operation. The particulate collecting roller 60 can be in the form of a cylindrical member having a tacky or sticky outer surface 114. When the outer surface 114 of the roller 60 engages various particles 54 and other similar matter that is engaged with the articles 42 being processed, the tacky or sticky outer surface 114 of the roller 60 overcomes any electrostatic attraction between the particulate matter and the article. The particles 54 and other matter can thereby be removed from the articles 42 being processed and retained on the roller portion 110 throughout the remainder of the drying operation. At the completion of the drying operation, the roller portion 110, or the entire particulate collecting roller 60, can be removed from the attachment receptacle 50 and cleaned for further reuse. In certain aspects of the device, the particulate collecting roller 60 can include an adhesive material. This adhesive material can be an adhesive material applied to the outer surface 114 of the roller 60. The adhesive material can also be in the form of layers of detachable adhesive sheets that can be removed over the course of several drying operations.

According to various aspects of the device, the particulate collecting roller 60 can include an accessory internal bracket 120 that is configured to attach to the first and second ends 66, 68 of the attachment receptacle 50. This accessory bracket 120 can receive the roller portion 110 that is disposed outside of the accessory bracket 120. When the roller portion 110 has been used for a predetermined number of drying operations, the roller portion 110 can be disposed of and replaced with a new roller portion 110 to be placed on or attached to the accessory bracket 120. In this manner, a portion of the particulate collecting roller 60 can be consumable with roller portions 110 that can be replaced over time to extend the life of the accessory bracket 120. It is also contemplated that different types of roller portions 110 can be placed on the accessory bracket 120 for providing different functionalities with respect to the particulate collecting roller 60.

It is also contemplated that the particulate collecting roller 60 can be made up of a single piece that is adapted to rotate about the first and second ends 66, 68. At the conclusion of its usefulness, this single piece roller 60 can be disposed of and replaced with a new roller portion 110 that can be attached to the attachment receptacle 50 for the lifter 10.

Figure 9:
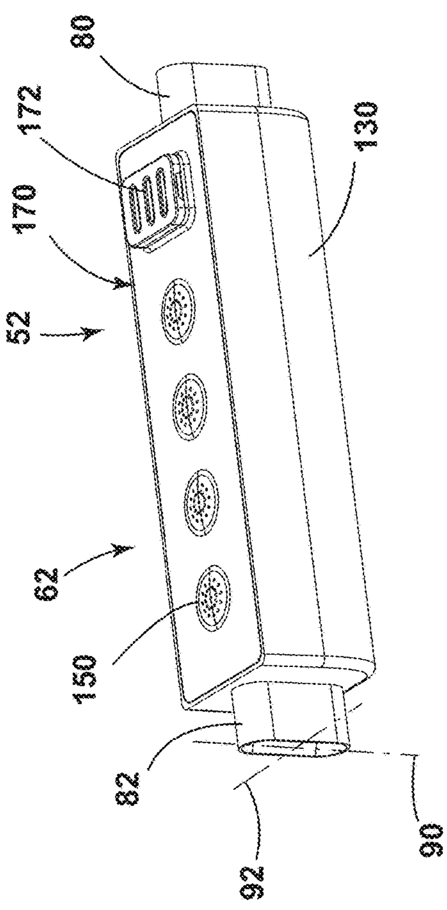
FIG. 9 is a perspective view of a fluid dispenser separated from the attachment receptacle of the lifter.
Figure 10:
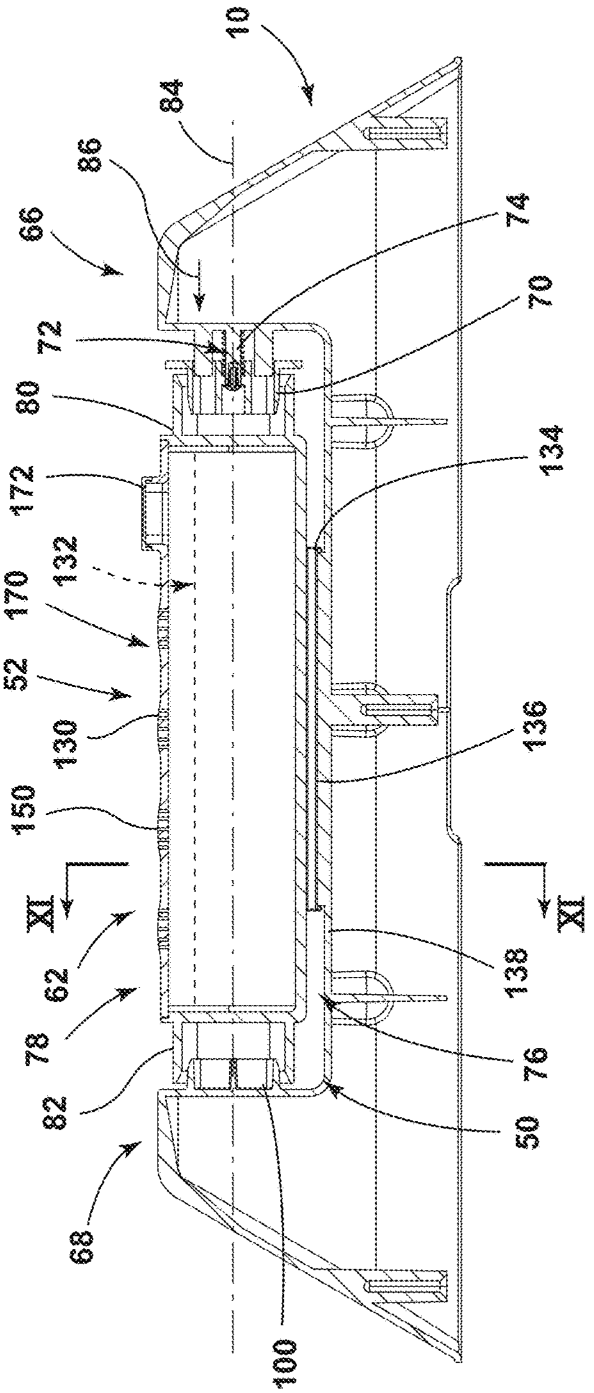
FIG. 10 is a cross-sectional view of the lifter of FIG. 3 taken along the line X-X and showing the fluid dispenser attached to the attachment receptacle of the lifter.
Figure 11:
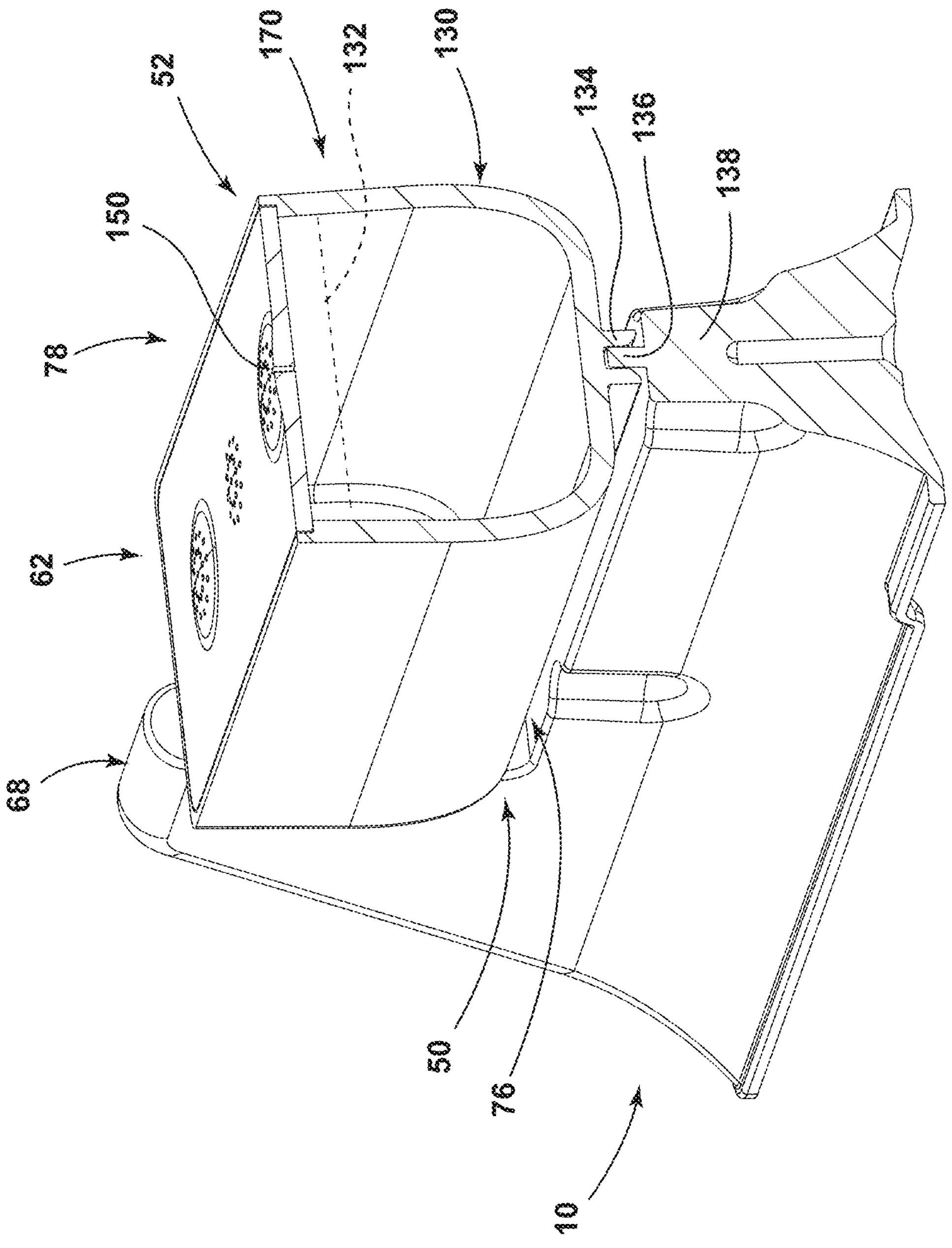
FIG. 11 is a cross-sectional view of the lifter of FIG. 10 taken along the line XI-XI.
Figure 12:
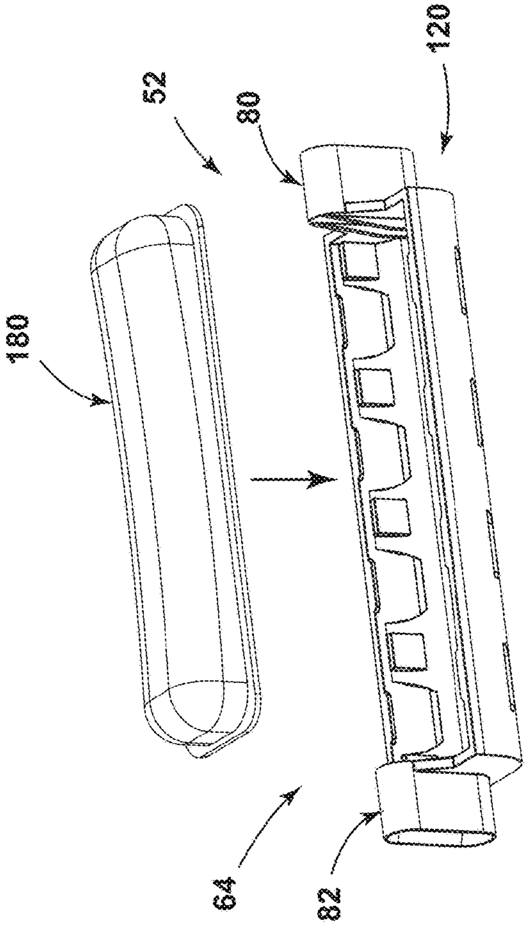
FIG. 12 is an exploded perspective view of an aspect of the consumable fabric softener.
Figure 13:
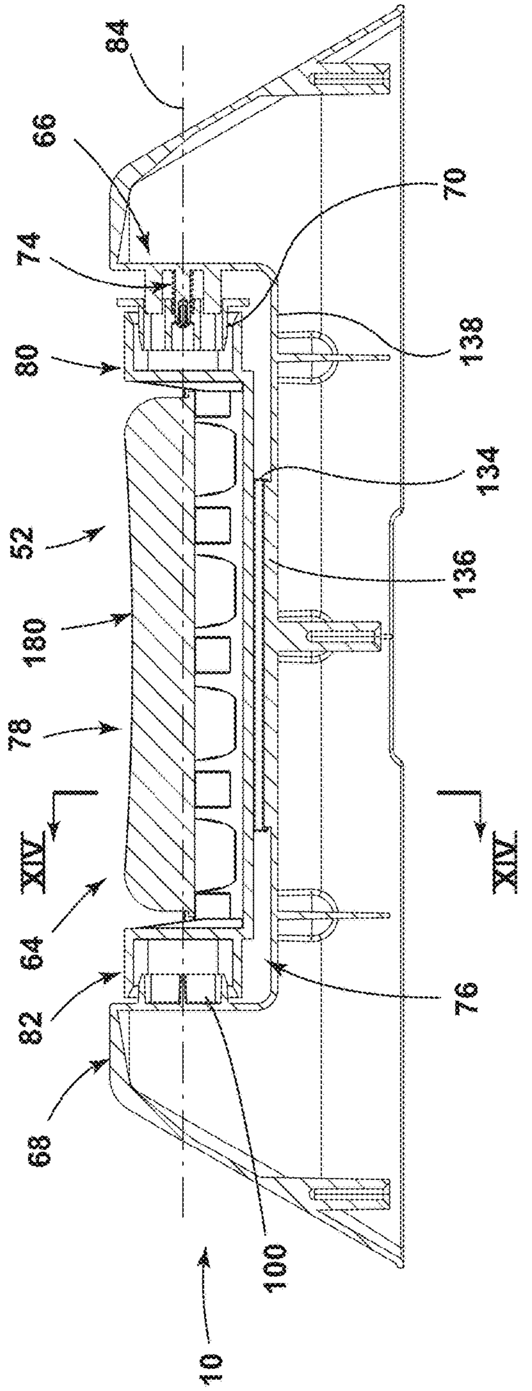
FIG. 13 is a cross-sectional view of the lifter of FIG. 3 taken along the line XIII-XIII and showing the consumable fabric softener attached to the attachment receptacle of the lifter.
Figure 14:
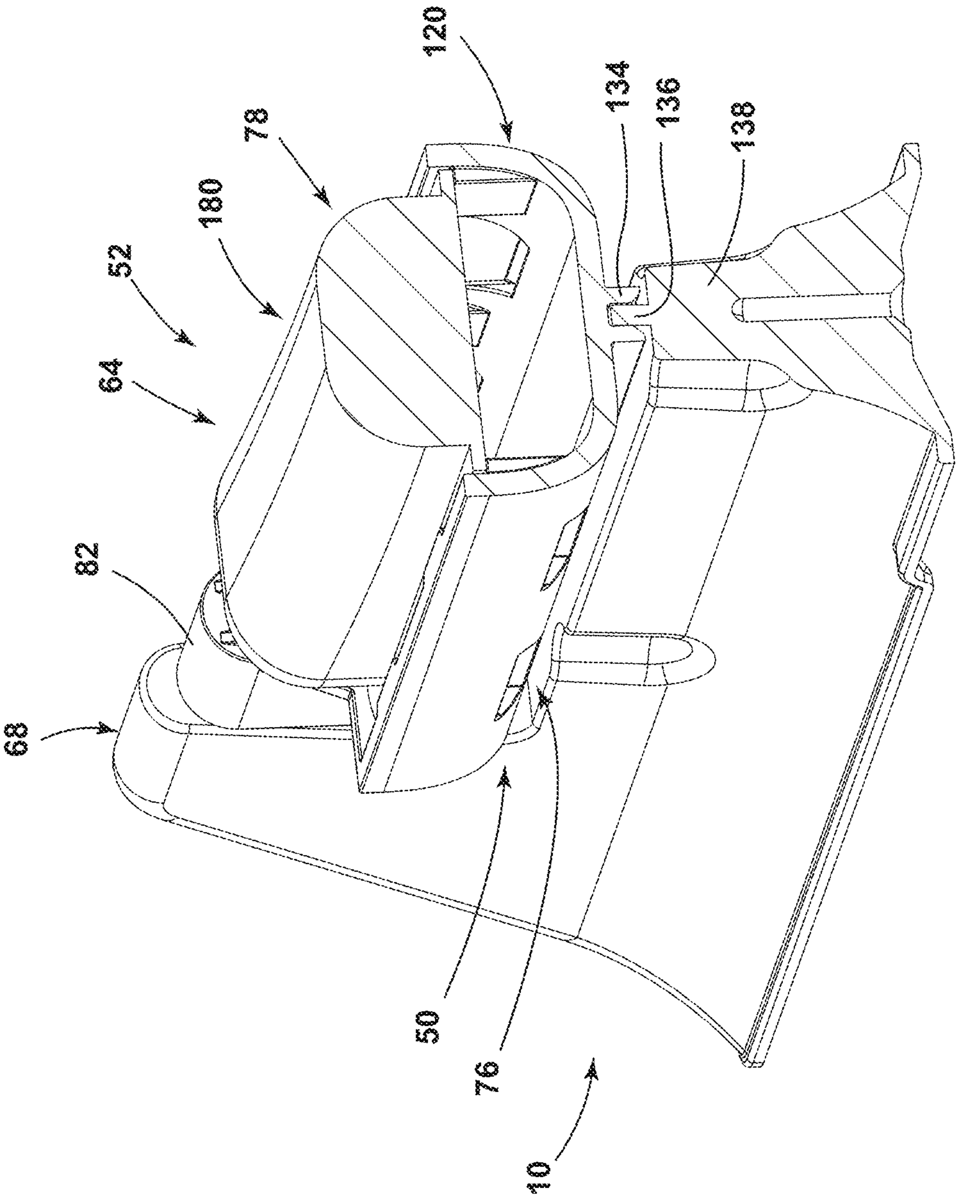
FIG. 14 is a cross-sectional view of the lifter of FIG. 13 taken along the line XIV-XIV.

Referring now to FIGS. 9-11, the particulate removal accessories can also include a fluid dispenser 62. This fluid dispenser 62 can include a reservoir 130 that selectively stores a treating fluid 132. This treating fluid 132 can be in the form of water, fabric softener, a fragrance material, and other similar treating fluids 132. The reservoir 130 includes the first and second sides 80, 82 that selectively engage the first and second ends 66, 68 of the attachment receptacle 50. Additionally, a portion of the reservoir 130 can include an attachment portion 134 that engages with an alignment tab 136 of the attachment receptacle 50. The alignment tab 136 can extend upward from a base 138 of the attachment receptacle 50 for the lifter 10. In this manner, the reservoir 130 can be held in a secured position with respect to the lifter 10 by the first and second ends 66, 68 of the attachment receptacle 50, as well as the alignment tab 136.

Referring again to FIGS. 9-11, during operation of the laundry appliance 14, the fluid reservoir 130 of the fluid dispenser 62 rotates with the drum 12 about the rotational axis 16 during rotation of the drum 12. The reservoir 130 includes a plurality of fluid apertures 150 that selectively release the treating fluid 132 as fine droplets that cooperate with the drum 12 and the process air 46 to be distributed among the articles 42 being processed. In certain aspects of the device, the treating fluid 132 can be dispensed as a mist of very fine droplets that are then distributed through the processing space 18 for treating the articles 42 being processed. This treating fluid 132 can be in the form of a substance that mitigates electrostatic charges that may be experienced within the articles 42 being processed, as well as between particles 54 and the articles 42 being processed. By mitigating this electrostatic charge, process air 46 moving through the drum 12 is more able to separate the particles 54 from the articles 42 being processed. Additionally, the treating fluid 132 may be a wrinkle-releasing solution that can be used to mitigate the presence of wrinkles within the articles 42 being processed. It is contemplated that the reservoir 130 can include different chambers for holding different treating fluids 132.

According to various aspects of the device, as exemplified in FIGS. 3-5 and 9-11, the laundry appliance 14 can cooperate with the fluid dispenser 62 by rotating the drum 12 at the particular speed that allows for greater release of the treating fluid 132 through the plurality of fluid apertures 150. Where treating fluid 132 is meant to be retained within the reservoir 130, the drum 12 may rotate at a particular speed that produces a centrifugal base 160 that maintains the treating fluid 132 within the reservoir 130. When it is desired for the treating fluid 132 to be released, the drum 12 can slow its rotation to release the amount of centrifugal base 160 that acts upon the treating fluid 132. As the drum 12 is slowed, gravity 164 can overcome the centrifugal base 160 and the treating fluid 132 is able to drop from the fluid dispenser 62 of the lifter 10, through the plurality of fluid apertures 150, and fall onto the articles 42 being processed. Also, as the drum 12 is slowed, it is typical that the treating fluid 132 will fall from the lifter 10 when the lifter 10 is positioned within and moves through an upper portion 162 of the processing space 18. In this manner, the treating fluid 132 can fall from the reservoir 130 and be spread throughout a wide area to engage a large surface area of the articles 42 being processed. Also, in certain drying operations, where a large amount of heat is used within the process air 46, this heat may at least partially evaporate portions of the treating fluid 132 to create steam within the processing space 18. This steam can be used as an electrostatic mitigating substance or a wrinkle-releasing substance within the processing space 18 of the drum 12.

Referring again to FIGS. 5 and 9-11, a reservoir 130 of the fluid dispenser 62 can include the plurality of fluid apertures 150 that allow for the treating fluid 132 to be sprinkled from the reservoir 130 on to the articles 42 being processed. The reservoir 130 can also include a removable cap 172 that can be separated from the reservoir 130 for allowing the user to dispense a treating fluid 132 into the reservoir 130.

In certain aspects of the device, it is contemplated that a user can purchase a pre-filled reservoir 130 that can be used during performance of a drying operation and then reused or discarded after use. In the case of a reservoir 130 that is discarded, it is contemplated that the reservoir 130 can be a reservoir portion 170 that can be attached to and separable from the accessory bracket 120, where the reservoir portion 170 can be made of a biodegradable material. In such an aspect of the device, the accessory bracket 120 of the fluid dispenser 62 can be reusable for receiving subsequent reservoir portions 170 of the fluid dispenser 62.

Referring now to FIGS. 3-5 and 12-14, the particulate removal accessories can also include the consumable fabric softener 64. This consumable fabric softener 64 can include the accessory bracket 120 that is configured to extend between the first and second ends 66, 68 of the attachment receptacle 50. The accessory bracket 120 then receives the consumable fabric softening portion 180 that can be attached to the accessory bracket 120 and secured thereto during the performance of various laundry cycles. It is contemplated that the consumable fabric softening portion 180 can be used over the course of several drying operations. As with the fluid dispenser 62, it is contemplated that the accessory bracket 120 engages the first and second ends 66, 68 of the attachment receptacle 50 and also engages the alignment tab 136 that extends upwards from the base 138 of the attachment receptacle 50. In this manner, the accessory bracket 120 is maintained in a secured position with respect to the lifter 10 and the drum 12 as the drum 12 rotates about the rotational axis 16. The reservoir portion 170 and the fabric softening portion 180 can then be secured to the accessory bracket 120, as desired, for use during the laundry cycle.

According to the various aspects of the device, as exemplified in FIGS. 3-14, the alignment tab 136 of the attachment receptacle 50 extends upward from the base 138 of the lifter 10 and into the accessory space 76 that is disposed between the first and second ends 66, 68. As discussed herein, the alignment tab 136 is configured to secure some of the particulate removal accessories in a fixed position with respect to the lifter 10. By way of example, and not limitation, the fluid dispenser 62 and the consumable fabric softener 64 are configured to engage the alignment tab 136. The alignment tab 136 maintains a fixed position of each of the fluid dispenser 62 and the consumable fabric softener 64, respectively, with respect to the lifter 10 and the attachment receptacle 50. Conversely, the particulate collecting roller 60 in the installed position 78 is maintained in an offset position with respect to the alignment tab 136. This configuration allows the roller portion 110 of the particulate collecting roller 60 to rotate freely about the longitudinal axis 84 that extends between the first and second ends 66, 68.

Referring again to FIGS. 2-14, it is contemplated that a single lifter 10 among the plurality of lifters 10 within the drum 12 includes the attachment receptacle 50. In such an aspect of the device, this single lifter 10 can be used for installing and removing the various particulate removal accessories from the appliance 14.

Referring again to FIG. 5, it is also contemplated that multiple lifters 10 can include dedicated attachment receptacles 50. In such an aspect of the device, the same particulate removal accessory 52 can be installed among the various attachment receptacles 50 for the lifters 10. It is also contemplated that different particulate removal accessories can be installed in different lifters 10 to provide combinations of functionalities within the laundry appliance 14.

By way of example, and not limitation, one of the lifters 10 in the attachment receptacle 50 can include a fluid dispenser 62 that dispenses a static-mitigating treating fluid 132 on to the articles 42 being processed. Simultaneously, another of the lifters 10 can include the particulate collecting roller 60 that is adapted to collect the particles 54 from the articles 42 being processed. Accordingly, certain lifters 10 can be fitted with accessories having different functions that can be utilized in combination for achieving a desired overall result with respect to a particular drying operation.

Referring again to FIGS. 1-14, the particulate removal system for the laundry appliance 14 can include the rotating drum 12 having the outer wall 190 that defines the processing space 18. The rotating drum 12 cooperates with the airflow path 40 that delivers process air 46 through the processing space 18 to dehumidify articles 42 within the processing space 18. The lifter 10 extends from the outer wall 190 and into the processing space 18. In such an aspect of the device, the lifter 10 defines an attachment receptacle 50. The lifter 10 is adept to rearrange the articles 42 within the processing space 18 during performance of a drying operation. The particulate removal accessory 52 is selectively removable from the attachment receptacle 50. The particulate removal accessory 52 operates to separate particles 54 from the articles 42 being processed. The particulate removal accessory 52 includes at least one of the particulate collecting roller 60, the fluid dispenser 62, and the consumable fabric softener 64.

Referring again to FIGS. 1-14, the lifter 10 can be configured for attachment to an inner surface 48 of the rotating drum 12, where the lifter 10 defines an attachment receptacle 50 that is disposed within the processing space 18. The lifter 10 is further configured to rearrange articles 42 within the processing space 18 during performance of a drying operation.

According to the various aspects of the device, use of the attachment receptacle 50 for at least one of the lifters 10 within the drum 12 provides the user with multiple functions that can be installed within the lifters 10 for achieving a desired result within a particular drying operation. Additionally, the attachment receptacle 50 provides a continued method for attaching and detaching the various particulate removal accessories. This allows the user to refill or replace portions of the accessories for use during a current drying operation as well as subsequent drying operations. The removability of the various accessories also provides the use with a convenient mechanism for switching out one accessory 52 for another depending upon the articles 42 being processed, the amount of drying required or desired within a particular drying operation, and other factors.

According to various aspects of the device, it is contemplated that the various consumable portions of the particulate removal accessory 52 can last for an extended period of time. By way of example, and not limitation, the fabric softening portion 180 of the consumable fabric softener 64 can last for approximately three, approximately six months, or other time frame, depending on the configuration of the fabric softening portion 180 and the number of drying operations that can be performed during this time period. Similarly, the roller portion 110 for the particulate collecting roller 60 can be reused a number of times and cleaned after each drying operation or a certain number of drying operations to maintain the tackiness or stickiness of the outer surface 114 of the roller portion 110. The roller portion 110 can also include electrostatic mitigation materials that can last for an extended period of time.

The invention disclosed herein is further summarized in the following paragraphs and is further characterized by combinations of any and all of the various aspects described therein.

According to one aspect of the present disclosure, a laundry appliance includes a drum that is disposed within a cabinet. The drum defines a processing space and rotationally operates during a drying operation. The drum cooperates with an airflow path to dehumidify articles being processed within the processing space. A lifter is attached to an inner surface of the drum. The lifter defines an attachment receptacle and rearranges the articles within the processing space during performance of the drying operation. A particulate removal accessory is selectively removable from the attachment receptacle and operates to separate particulate from the articles being processed.

According to another aspect, the particulate removal accessory includes at least one of a particulate collecting roller, a fluid dispenser, and a consumable fabric softener.

According to another aspect, the attachment receptacle includes a first end and a second end. At least one of the first end and the second end includes an outwardly biased receiver that selectively engages the particulate removal accessory in an installed position.

According to another aspect, the second end of the attachment receptacle is a fixed bracket that selectively receives the particulate removal accessory.

According to another aspect, the attachment receptacle includes an alignment tab that extends from the lifter and into an accessory space that is disposed between the first end and the second end.

According to another aspect, a particulate collecting roller in the installed position is positioned in an offset position with respect to the alignment tab.

According to another aspect, each of a fluid dispenser and a consumable fabric softener engage the alignment tab. The alignment tab maintains a fixed position of each of the fluid dispenser and the consumable fabric softener, respectively, with respect to the attachment receptable.

According to another aspect, a particulate collecting roller engages the first end and the second end. The first end and the second end define a rotational axis that extends through a roller portion of the particulate collecting roller, wherein the roller rotationally operates about the rotational axis.

According to another aspect, the particulate collecting roller includes a static-mitigating material that reduces electrostatic charges. The roller further includes an adhesive material that collects the particulate.

According to another aspect, the fluid dispenser includes a reservoir that selectively stores a treating fluid. The fluid dispenser includes a plurality of fluid apertures that selectively release the treating fluid from the reservoir and into the processing space.

According to another aspect, the plurality of fluid apertures selectively release the treating fluid as fine droplets that cooperate with the drum and process air that is delivered through the airflow path to define a mist.

According to another aspect of the present disclosure, a particulate removal system for a laundry appliance includes a rotating drum that has an outer wall that defines a processing space. The drum cooperates with an airflow path that delivers process air through the processing space to dehumidify articles within the processing space. A lifter extends from the outer wall and into the processing space. The lifter defines an attachment receptacle and rearranges the articles within the processing space during performance of a drying operation. A particulate removal accessory is selectively removable from the attachment receptacle and operates to separate particulate from the articles being processed. The particulate removal accessory includes at least one of a particulate collecting roller, a fluid dispenser, and a consumable fabric softener.

According to another aspect, the attachment receptacle includes a first end and a second end. At least one of the first end and the second end includes an outwardly biased receiver that selectively engages the particulate removal accessory in an installed position. The second end of the attachment receptacle is a fixed bracket that selectively receives the particulate removal accessory.

According to another aspect, the attachment receptacle includes an alignment tab that extends from the lifter and into an accessory space that is disposed between the first end and the second end.

According to another aspect, the particulate collecting roller in an installed position is positioned in an offset position with respect to the alignment tab.

According to another aspect, each of the fluid dispenser and the consumable fabric softener engage the alignment tab. The alignment tab maintains a fixed position of each of the fluid dispenser and the consumable fabric softener, respectively, with respect to the attachment receptacle.

According to another aspect, the particulate collecting roller engages the first end and the second end. The first end and the second end define a rotational axis that extends through a roller portion of the particulate collecting roller. The roller rotationally operates about the rotational axis, and the roller includes a static-mitigating material that reduces electrostatic charges. The roller further includes an adhesive material that collects the particulate.

According to another aspect, the fluid dispenser includes a reservoir that selectively stores a treating fluid. The fluid dispenser includes a plurality of fluid apertures that selectively release the treating fluid from the reservoir and into the processing space. The plurality of fluid apertures selectively release the treating fluid as fine droplets that cooperate with the drum and the process air to define a mist.

According to yet another aspect of the present disclosure, a particulate removal system for a laundry appliance includes a lifter that is configured for attachment to an inner surface of a rotating drum. The lifter defines an attachment receptacle that is disposed within a processing space. The lifter is further configured to rearrange articles within the processing space during performance of a drying operation. A particulate removal accessory is selectively removable from the attachment receptacle. The particulate removal accessory operates to separate particulate from the articles being processed. The particulate removal accessory includes a particulate collecting roller, a fluid dispenser, and a consumable fabric softener that are selectively and alternatively attached to the attachment receptacle. The attachment receptacle includes a first end and a second end, and at least one of the first end and the second end includes an outwardly biased receiver that selectively engages the particulate removal accessory in an installed position.

According to another aspect, the attachment receptacle includes an alignment tab that extends from the lifter and into an accessory space that is disposed between the first end and the second end. The particulate collecting roller in the installed position is positioned in an offset position with respect to the alignment tab. Each of the fluid dispenser and the consumable fabric softener engage the alignment tab. The alignment tab selectively maintains a fixed position of each of the fluid dispenser and the consumable fabric softener, respectively, with respect to the attachment receptacle.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term “coupled” (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A laundry appliance comprising:

a drum disposed within a cabinet, wherein the drum defines a processing space and rotationally operates during a drying operation, wherein the drum cooperates with an airflow path to dehumidify articles being processed within the processing space;

a lifter attached to an inner surface of the drum, the lifter defining an attachment receptacle, wherein the lifter rearranges the articles within the processing space during performance of the drying operation; and a particulate removal accessory that is selectively removable from the attachment receptacle, wherein the particulate removal accessory operates to separate particulate from the articles being processed, wherein the attachment receptacle includes a first end and a second end, wherein at least one of the first end and the second end includes an outwardly biased receiver that selectively engages the particulate removal accessory in an installed position, wherein the second end of the attachment receptacle is a fixed bracket that selectively receives the particulate removal accessory.

2. The laundry appliance of claim 1, wherein the particulate removal accessory includes at least one of a particulate collecting roller, a fluid dispenser, and a consumable fabric softener.

3. The laundry appliance of claim 2, wherein the fluid dispenser includes a reservoir that selectively stores a treating fluid, wherein the fluid dispenser includes a plurality of fluid apertures that selectively release the treating fluid from the reservoir and into the processing space.

4. The laundry appliance of claim 3, wherein the plurality of fluid apertures selectively release the treating fluid as fine droplets that cooperate with the drum and process air delivered through the airflow path to define a mist.

5. The laundry appliance of claim 1, wherein the attachment receptacle includes an alignment tab that extends from the lifter and into an accessory space that is disposed between the first end and the second end.

6. The laundry appliance of claim 5, wherein a particulate collecting roller in the installed position is positioned in an offset position with respect to the alignment tab.

7. The laundry appliance of claim 5, wherein each of a fluid dispenser and a consumable fabric softener engage the alignment tab, wherein the alignment tab maintains a fixed position of each of the fluid dispenser and the consumable fabric softener, respectively, with respect to the attachment receptacle.

8. The laundry appliance of claim 1, wherein a particulate collecting roller engages the first end and the second end, wherein the first end and the second end define a rotational axis that extends through a roller portion of the particulate collecting roller, wherein the roller rotationally operates about the rotational axis.

9. The laundry appliance of claim 8, wherein the particulate collecting roller includes a static-mitigating material that reduces electrostatic charges, wherein the roller further includes an adhesive material that collects the particulate.

10. A laundry appliance comprising:

a drum disposed within a cabinet, wherein the drum defines a processing space and rotationally operates during a drying operation, wherein the drum cooperates with an airflow path to dehumidify articles being processed within the processing space;

a lifter attached to an inner surface of the drum, the lifter defining an attachment receptacle, wherein the lifter rearranges the articles within the processing space during performance of the drying operation; and a particulate removal accessory that is selectively removable from the attachment receptacle, wherein the particulate removal accessory operates to separate particulate from the articles being processed, wherein the attachment receptacle includes a first end and a second end, wherein at least one of the first end and the second end includes an outwardly biased receiver that selectively engages the particulate removal accessory in an installed position, wherein the attachment receptacle includes an alignment tab that extends from the lifter and into an accessory space that is disposed between the first end and the second end.

11. The laundry appliance of claim 10, wherein the particulate removal accessory includes at least one of a particulate collecting roller, a fluid dispenser, and a consumable fabric softener.

12. The laundry appliance of claim 10, wherein the second end of the attachment receptacle is a fixed bracket that selectively receives the particulate removal accessory.

13. The laundry appliance of claim 11, wherein the particulate collecting roller in the installed position is positioned in an offset position with respect to the alignment tab.

14. The laundry appliance of claim 13, wherein the particulate collecting roller engages the first end and the second end, wherein the first end and the second end define a rotational axis that extends through a roller portion of the particulate collecting roller, wherein the roller rotationally operates about the rotational axis.

15. The laundry appliance of claim 14, wherein the particulate collecting roller includes a static-mitigating material that reduces electrostatic charges, wherein the roller further includes an adhesive material that collects the particulate.

16. The laundry appliance of claim 11, wherein each of the fluid dispenser and the consumable fabric softener engage the alignment tab, wherein the alignment tab maintains a fixed position of each of the fluid dispenser and the consumable fabric softener, respectively, with respect to the attachment receptacle.

17. The laundry appliance of claim 11, wherein the fluid dispenser includes a reservoir that selectively stores a treating fluid, wherein the fluid dispenser includes a plurality of fluid apertures that selectively release the treating fluid from the reservoir and into the processing space.

18. The laundry appliance of claim 17, wherein the plurality of fluid apertures selectively release the treating fluid as fine droplets that cooperate with the drum and process air delivered through the airflow path to define a mist.

19. A laundry appliance comprising:

a drum disposed within a cabinet, wherein the drum defines a processing space and rotationally operates during a drying operation, wherein the drum cooperates with an airflow path to dehumidify articles being processed within the processing space;

a lifter attached to an inner surface of the drum, the lifter defining an attachment receptacle, wherein the lifter rearranges the articles within the processing space during performance of the drying operation; and a particulate removal accessory that is selectively removable from the attachment receptacle, wherein the particulate removal accessory operates to separate particulate from the articles being processed, wherein the attachment receptacle includes a first end and a second end, wherein at least one of the first end and the second end includes an outwardly biased receiver that selectively engages the particulate removal accessory in an installed position, wherein a particulate collecting roller engages the first end and the second end, wherein the first end and the second end define a rotational axis that extends through a roller portion of the particulate collecting roller, wherein the roller rotationally operates about the rotational axis.

20. The laundry appliance of claim 19, wherein the particulate collecting roller includes a static-mitigating material that reduces electrostatic charges, wherein the roller further includes an adhesive material that collects the particulate.

* * * * *